Mar. 20, 1923.
W. H. CAMPBELL
1,448,725
SIEVE AND METHOD OF MANUFACTURING SAME
Filed Dec. 27, 1921
4 sheets-sheet 1
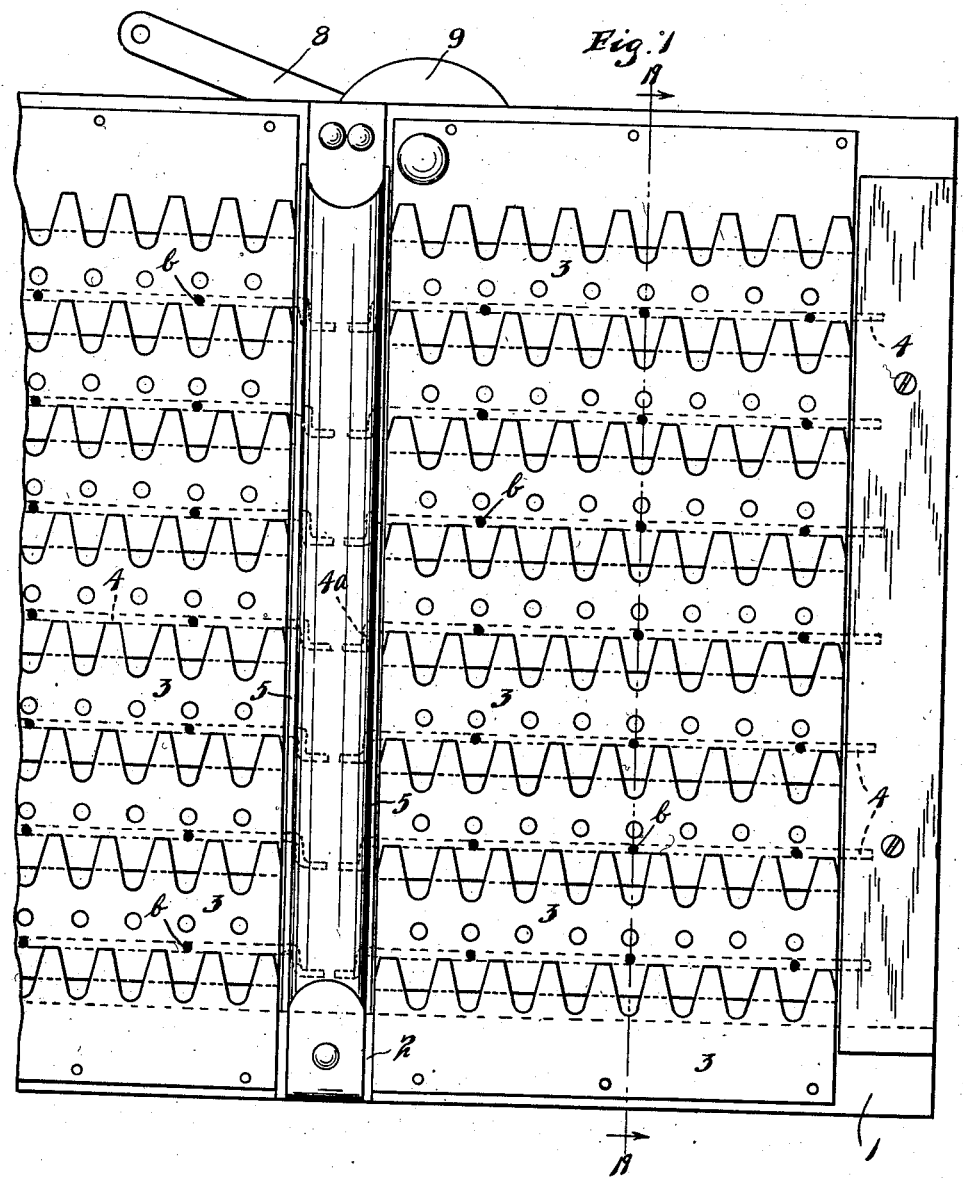
INVENTOR.
WILLIAM H. CAMPBELL.
BY HIS ATTORNEY.

Mar. 20, 1923.
W. H. CAMPBELL
SIEVE AND METHOD OF MANUFACTURING SAME
Filed Dec. 27, 1921
1,448,725
4 sheets-sheet 2
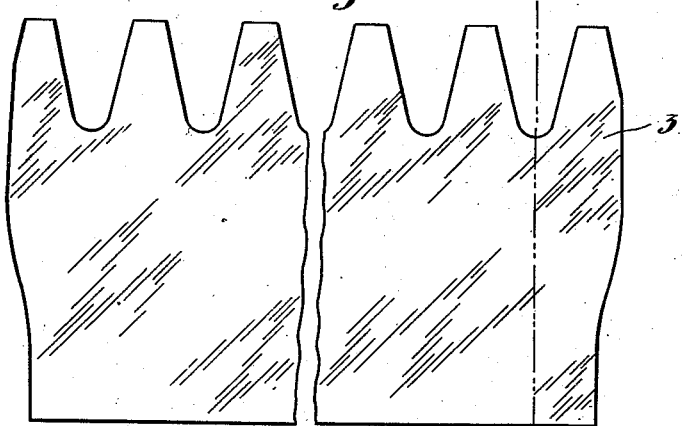
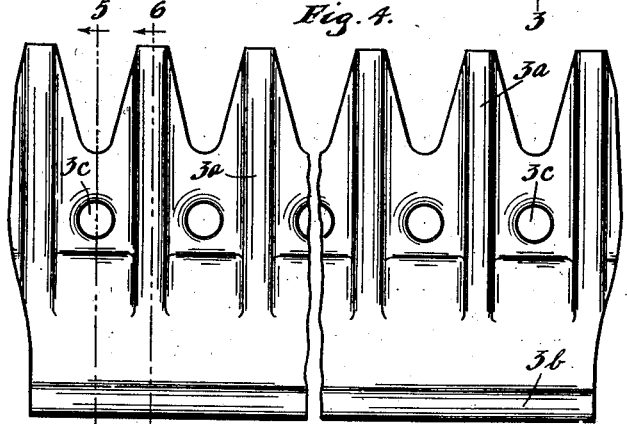
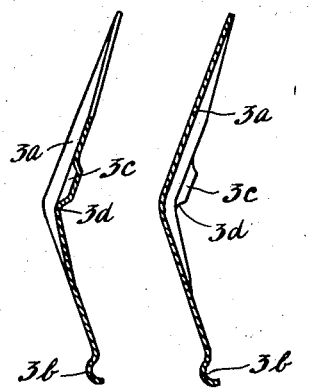
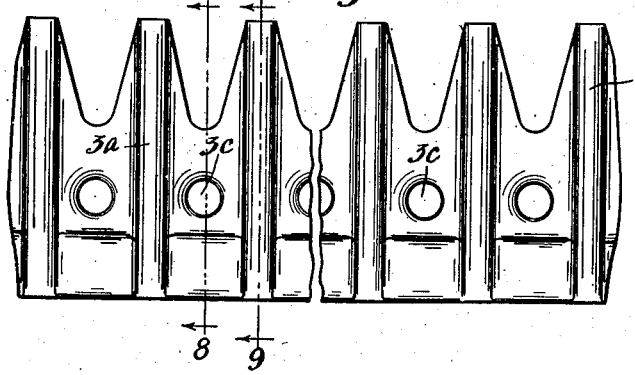
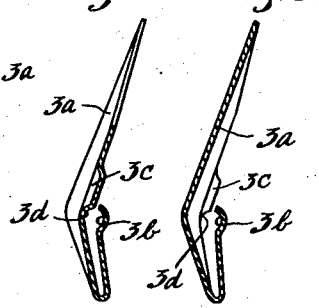
INVENTOR.
WILLIAM H. CAMPBELL.
BY HIS ATTORNEY.

Mar. 20, 1923.
W. H. CAMPBELL
SIEVE AND METHOD OF MANUFACTURING SAME
Filed Dec. 27, 1921
4 sheets-sheet 3

INVENTOR.
WILLIAM H. CAMPBELL
BY HIS ATTORNEY.

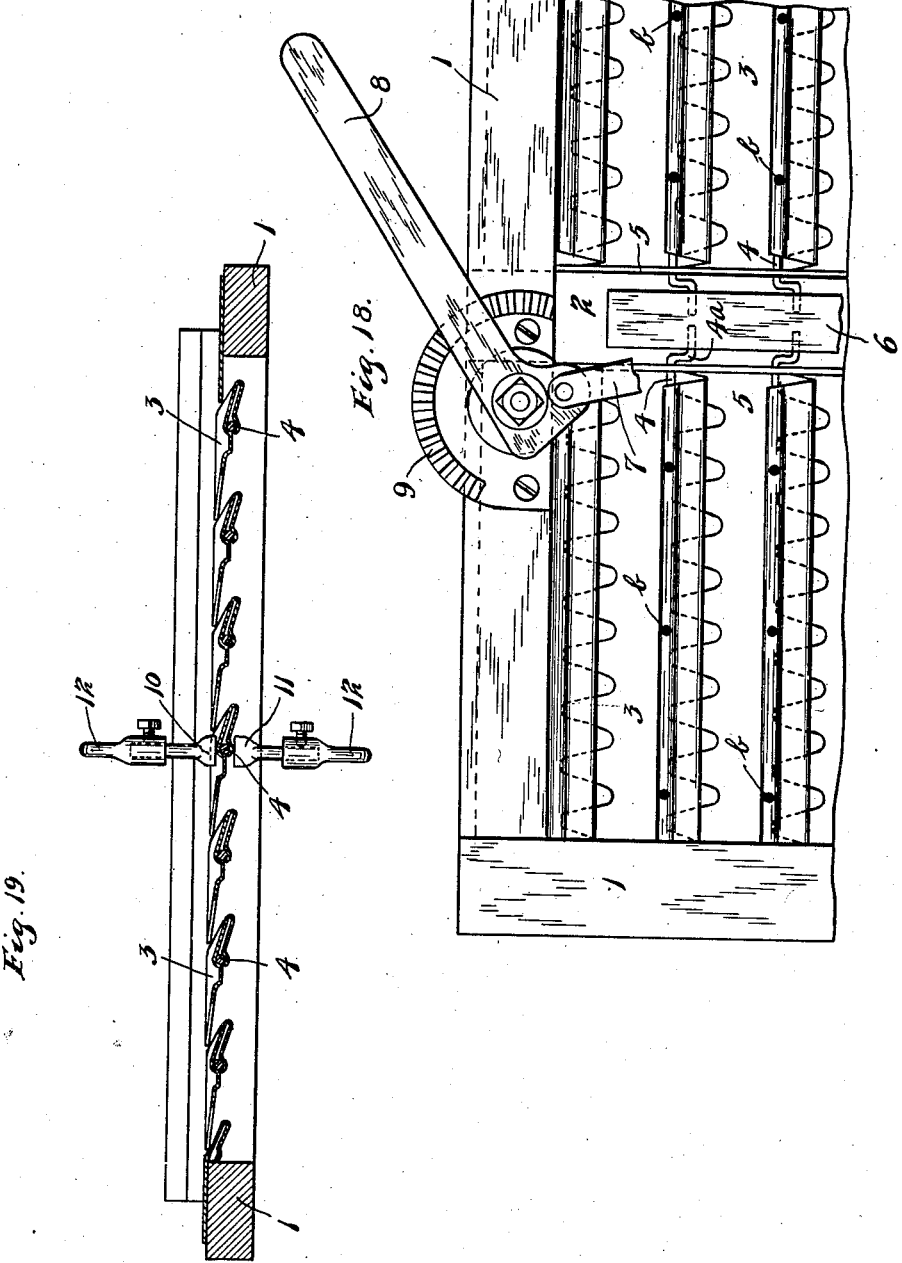

Patented Mar. 20, 1923.

1,448,725

UNITED STATES PATENT OFFICE.

WILLIAM H. CAMPBELL, OF WEBSTER CITY, IOWA, ASSIGNOR TO CHARLES CLOSZ COMPANY, OF WEBSTER CITY, IOWA, A CORPORATION OF IOWA.

SIEVE AND METHOD OF MANUFACTURING SAME.

Application filed December 27, 1921. Serial No. 524,838.

*To all whom it may concern:*

Be it known that I, WILLIAM H. CAMPBELL, a citizen of the United States, residing at Webster City, in the county of Hamilton and State of Iowa, have invented certain new and useful Improvements in Sieves and Methods of Manufacturing Same; and I do hereby declare the following to be a full, clear, and exact description of the invention, such as will enable others skilled in the art to which it appertains to make and use the same.

This invention relates to a method of making sieves and chaffers, particularly of the adjustable type formed of metal slats, which slats are suitably serrated and ridged and arranged consecutively in overlapping relation. In the type of sieve or chaffer contemplated, the said slats are arranged for swinging movement about a longitudinal axis, and for this purpose, each slat is secured to a transverse rod forming the journal or pivot about which the slat is swung. It has heretofore been the practice to secure the slats to said rods by providing holes in the slats through which the rods were passed, the two then being soldered together. This method of securing the slats to the rods was slow and tedious and not entirely reliable in service.

It is an object of this invention to so form the slat that proper engagement with this rod may be had so that the slats can be efficiently and expeditiously secured thereto by the spot welding process.

It is a further object of this invention to so form the slats that proper surfaces will be provided for the engagement of the spot welding tools so that objectionable burning of the slats by said tools will be avoided.

These and other objects and advantages of the invention will be fully set forth in the following description made in connection with the accompanying drawings showing the sieve, and in which—

Fig. 1 is a plan view of the assembled device with chaffer slats;

Fig. 2 is a partial plan view of one of the blanks from which the chaffer slats are formed;

Fig. 3 is a vertical section taken on the line 3—3 of Fig. 2;

Fig. 4 is a partial plan view of the slat after the first step of bending or forming the same;

Fig. 5 is a vertical section taken on the line 5—5 of Fig. 4;

Fig. 6 is a vertical section taken on the line 6—6 of Fig. 4;

Fig. 7 is a partial plan view of the slat after the second or final forming or bending step;

Fig. 8 is a vertical section on the line 8—8 of Fig. 7;

Fig. 9 is a vertical section on the line 9—9 of Fig. 7;

Fig. 18 is a partial plan view of the side of the chaffer opposite that shown in Fig. 1; and Fig. 19 is a longitudinal section on the line 19—19 of Fig 1 showing how the chaffer or sieve is passed through the spot welding apparatus.

Figure 10:
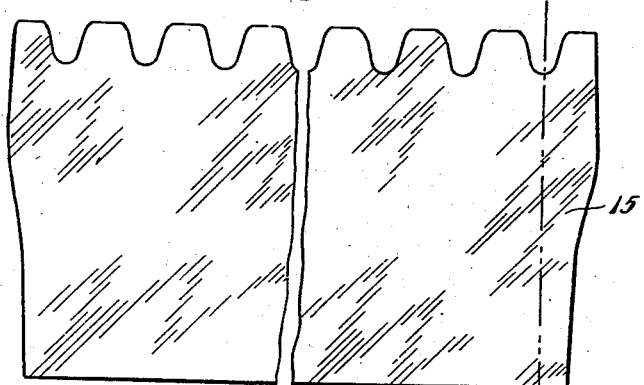
Fig. 10 is a partial plan view of one of the sieve slat blanks.
Figure 11:
Fig. 11 is a vertical section taken on the line 11—11 of Fig. 10.
Figure 12:
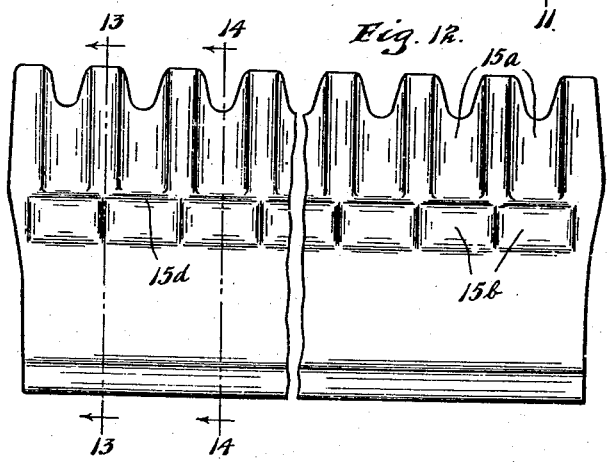
Fig. 12 is a view similar to Fig. 10, showing the slat after the first bending operation.
Figures 13, 14:
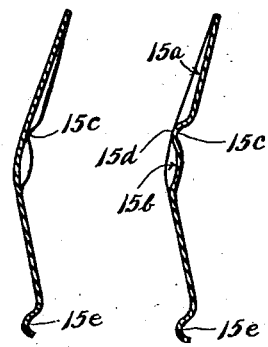
Fig. 13 is a vertical section of Fig. 12 taken on the line 13—13.
Fig. 14 is a vertical section of Fig. 12 taken on the line 14—14.
Figure 15:
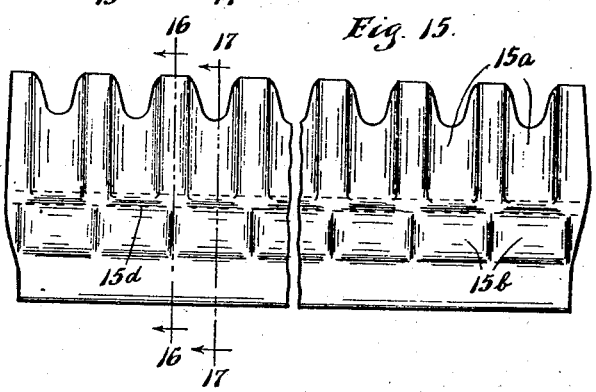
Fig. 15 is a partial plan view of the sieve slat when fully bent.
Figures 16, 17:
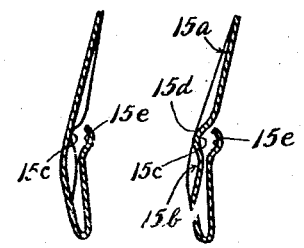
Fig. 16 is a vertical section taken on the line 16—16 of Fig. 15.
Fig. 17 is a vertical section on the line 17—17 of Fig. 15.

While the method of this invention is applicable to the manufacture of any sieve or chaffer of the type indicated, the specific device illustrated, as shown in Fig. 1, comprises a rectangular frame 1 divided by a bar 2 into two longitudinal sections. A series of slats 3 extend between the sides of the frame 1 and the bar 2, and are rigidly secured to rods 4, the outer ends of which rods are journaled is the sides of the frame 1 and the central portions of which are passed through and journaled in a pair of strips 5 secured to the sides of the bar 2. At their inner ends, the rods 4 are formed with crank portions 4ª, the horizontal portions of which cranks extend into and are pivoted in a bar 6 spaced some distance from and extending parallel to the bar 2. This bar 6 has connected thereto a member 7 which is movable longitudinally of the sieve by an eccentric connection with a lever 8, this lever being held in its various positions by engagement of a detent thereon with a fixed arcuate rack member 9. Movement of the lever 8, therefore, moves the bar 6 longitudinally and swings the rods 4 about their journals, thereby moving the slats 3 to different positions, to vary the spacing between said slats for various operations on different materials and for other purposes. The assembled device illustrated is shown as having therein the chaffer slats shown in Figs. 2 to 9. The sieve slats shown in Figs. 10 to 17 will, of course, be similarly assembled.

The blank from which the chaffer slats 3 are formed is cut or died out, as shown in Figs. 2 and 3, and is then passed through suitable dies to give the form shown in Figs. 4 to 6. In this first step the transverse ridges 3$^a$ are formed in the slat and the teeth thereof, which ridges are essential to the operative structure of the chaffer. At the same time, a groove 3$^b$ is formed in the slat adjacent the longitudinal edge thereof opposite the toothed edge and the slat is also bent along an intermediate longitudinal line, as shown in Figs. 5 and 6, and this bend will form a shallow longitudinal groove with the outer surface thereof diverging from the line of the bend. At the same time, spaced depressions 3$^c$ are formed between the transverse ridges 3$^a$ and adjacent to the intermediate line along which the slat is bent, or, in other words, adjacent the apex of the groove formed by said bend. The partially formed slat, as shown in Figs. 4 to 6, is then passed through another die in which the edge of the same is folded over and the slat brought to the form shown in Figs. 7 to 9. After the slats are in the latter form, the same are assembled on the rods 4 in the sieve frame 1 and are ready to be secured to the rods 4.

It will be noted by reference to Figs. 5 and 8 that by forming the depressions 3$^c$, a groove effect 3$^d$ is produced in the surface of the slat adjacent each of said depressions 3$^c$, which, when the slat is bent, is alined with and opposite to the groove 3$^b$, and the rods 4 are passed into these grooves 3$^b$ and 3$^d$, and between the folded portions of the slat.

It has been found that in the process of spot welding, if the tools are brought down on a too flat surface, the metal of the slat will be objectionably burned and it is to avoid this damage, as well as to provide a good contact with the rod 4, that the depressions 3$^c$ are provided. By reference to Fig. 8, it will be seen that a relatively elevated convex surface is formed on the slat on top of the groove 3$^d$, which surface is formed by the depression 3$^c$. A convex surface is also obviously formed on the surface outside of the groove 3$^b$ and the spot welding tools are brought down in engagement with these convex surfaces of the slat. These convex surfaces prevent a too extensive engagement of the welding tools with the surface of the slat and thus act to localize the heat and prevent objectionable burning of the metal.

The slat above described, which is illustrated in Figs. 2 to 9, is the slat used in the specific type of apparatus known as a chaffer. The slat for the apparatus which is specifically called the sieve is shown in Figs. 10 to 17. This slat is also formed from a toothed blank 15 illustrated in Figs. 10 and 11. The blank is first bent by suitable dies to bring the same into the condition shown in Figs. 12 to 14. In this bending operation, the slat is bent along a substantially central line to form an obtuse angle, which bend will, of course, form a shallow groove on the inside of the slat and a corresponding convex surface on the outside thereof. In this same operation, the transverse grooves 15$^a$ are formed in the slat to give the same the proper form for performing its sieve functions. Shallow grooves 15$^b$ are also impressed in the slat which are disposed in the rear of or in alinement with, and slightly separated from the grooves 15$^a$. These depressions 15$^b$ are also used in the operation of the sieve but it will be noted from inspection of Fig. 14, that these depressions form on the inner or concave side of the slat short grooves 15$^c$, and sharply defined convex surfaces 15$^d$ are correspondingly formed on the outside of the slat. During the first bending operation the slat also has formed at its edge opposite the toothed edge, a longitudinally extending shallow groove 15$^e$. In the final bending operation, the slat is brought to the form shown in Figs. 15 to 17, in which the edge opposite the toothed edge is folded over and the groove 15$^e$ is brought into oppositely alined relation with the series of grooves 15$^c$. The slat is so formed and bent that the edge thereof adjacent groove 15$^e$ is left somewhat spaced from the body of the slat when folded over, as clearly shown in Figs. 16 and 17. The rods 4 are passed between the folded portions of the slat in the grooves 15$^c$ and 15$^e$. The sieve slats are then assembled in the sieve frame in the same manner as above described for the chaffer slats and as shown in Figs. 18 and 19. When the frame is passed through the spot welding machine, the tools 10 and 11 thereof are brought into engagement with the convex surfaces opposite the grooves 15$^e$ and 15$^d$. The tools will thus come only into contact with the small area or surface and this portion is raised in a pronounced degree from the surrounding portions. The folded edge of the slat being slightly separated from the body thereof, the same can be pressed by the welding tools into firm contact with the rod 4, so that an effective weld will be insured.

Owing to the structure of the sieve slat 15, the depressions 15ᵇ formed therein cooperate with the transverse grooves 15ᵃ to give the desired convex surface 15ᵈ with which the welding tool contacts. With this sieve slat therefore it is unnecessary to make a distinct depression similar to the depression 3ᶜ in the chaffer slat to produce this convex surface. The effective and structural result, however, is the same with the sieve slat as with the chaffer slat. The sieve slats will be spot welded at the desired points to the rods 4 without objectionable burning of the metal and owing to the fact that the folded over edge of the slat is separated from the body thereof, a firm engagement with the rod is assured.

After the slats are assembled in the frame 1, as described, the slats are turned to closed position in the frame and the frame then passed longitudinally through a spot welding tool or apparatus, as indicated in Fig. 19. In this figure, the tools 10 and 11 indicate the spot welding tools and are carried in suitable brackets 12. The spot welding apparatus may be of any desired hand-operated or automatic type and in such apparatus the tools 10 and 11 are brought together on the material to be welded and suitable current furnished in the spot welding operation. It may be here stated that in folding the slat to the form shown in Figs. 7 and 8, the end of the slat in which the groove 3ᵇ is formed is left spaced from the body of the slat and this folded portion is resilient and can be pressed down toward the body of the slat. It is important to leave the space referred to, so that when the spot welding tools engage the convex surface, as described, the portions of the slat having the grooves therein can be brought into sure and firm contact with the rod 4. If the end of the slat having the groove 3ᵇ therein were bent into engagement with the body of the slat, such engagement might prevent the contact of the rod 4 by one or both of the grooves. The spot welding tools 11 being pressed together by some suitable mechanism such as treadle (not shown) or otherwise, clamps the parts of the slat into firm engagement with the rod 4 and the said parts are spot welded to said rod. The chaffer or sieve is moved longitudinally to bring the slats successively between the welding tools. It is only necessary to so weld the slats to the rods 4 at spaced portions, as indicated by the dots $b$ in Fig. 1 and the sieve is passed between the spot welding tools several times to complete the operation, the weld spots being thus alined longitudinally of the chaffer or sieve.

By forming the slat, as described, and spot welding the same to the rod, an immense saving of time and labor has been accomplished in the making of these sieves and a great advance in this art has been made. The method disclosed was only perfected and arrived at by long study and experiment and the sieves are now efficiently and expeditiously made by the use of this method, and the slats never separate from the rods in service.

This type of sieve is largely used in grain separating machines, particularly in threshing machines, and the sieves and chaffers are made with various sized teeth and conformations to perform different operations and to handle materials of different sizes.

The method is, of course, applicable to all types of sieves or chaffers which comprise the slats connected to the oscillatory rods.

It will also be understood that the word "sieve" as used in the claims herein, is used in its broad and generic sense to include all kinds of sieves, regardless of the size of the available mesh or the intended usage; or, in other words, the said word "sieve," as herein used, is meant to cover and include both "chaffers" and "sieves," as those terms are often specifically used by threshermen, manufacturers or others.

It will, of course, be understood that various changes may be made in the details, arrangement and succession of steps of the method without departing from the scope of applicant's invention, which, generally stated, consists in the matter shown and described and set forth in the following claims.

What is claimed is:

1. The method of forming a sieve consisting in cutting out a sheet metal slat, forming a groove adjacent one longitudinal edge thereof, forming transverse grooves in said slat and bending the slat along an intermediate longitudinal line, forming depressions in said slat adjacent said line to form relatively raised convex surfaces, folding over the said edge of the slat to bring said grooves substantially opposite said bending line, passing a rod through said groove and between the folded portions of said slat, holding said slat between the tools of a spot welding machine with said tools in contact with the outer surface of said groove and one of the convex surfaces formed by said depressions, pressing the opposite portions of said slat into close engagement with said rod and spot welding the same thereto.

2. The method of forming a sieve which consists of cutting out sheet metal slats, forming a groove adjacent one longitudinal edge of each of the same, forming spaced depressions intermediate said slat to form relatively raised convex surfaces and correspondingly short grooves, folding over said edge to bring the same into slightly spaced relation to the body of said slat and with the first mentioned groove opposite the grooves formed by said depressions, passing a rod through said grooves and between the folded portions of said slat, assembling said slats in a frame, passing the frame and slats through a spot welding apparatus, bringing each slat between the opposite tools of such apparatus with said tools in engagement with said relatively raised convex surfaces and the exterior surface of said first mentioned groove, pressing the folded portions of the slat into firm contact with said rod and welding the same thereto.

3. A sieve consisting of sheet metal slats having grooves adjacent one longitudinal edge and having transverse grooves therein, said slats being bent along an intermediate longitudinal line and having spaced depressions formed therein adjacent said line on the convex surface thereof to form relatively raised convex surfaces, said slats being folded along the longitudinal line to bring the said grooves substantially opposite said bending line, a rod passing through said groove between the folded portions of said slat and being spot welded to said slat.

In testimony whereof I affix my signature.

WILLIAM H. CAMPBELL.